United States Patent
Signaoff et al.

(10) Patent No.: US 8,861,520 B1
(45) Date of Patent: Oct. 14, 2014

(54) PACKET CLONING FOR ENHANCED DELIVERY OF COMMUNICATION FROM A SOURCE DEVICE TO ONE OR MORE DESTINATION DEVICES

(75) Inventors: Christopher S. Signaoff, Hutto, TX (US); Justin S. Signaoff, Round Rock, TX (US); Tom W. Opsahl, Flower Mound, TX (US); Edward M. Riley, III, Flower Mound, TX (US)

(73) Assignee: DirectPacket Research, Inc., Irving, TX (US)

( * ) Notice: Subject to any disclaimer, the term of this patent is extended or adjusted under 35 U.S.C. 154(b) by 467 days.

(21) Appl. No.: 13/034,444

(22) Filed: Feb. 24, 2011

(51) Int. Cl.
*H04L 12/28* (2006.01)

(52) U.S. Cl.
USPC ........................................ 370/390

(58) Field of Classification Search
USPC .......... 370/230, 235, 338, 389, 390, 400, 432
See application file for complete search history.

(56) References Cited

U.S. PATENT DOCUMENTS

| | | | |
|---|---|---|---|
| 7,707,300 B1* | 4/2010 | Champagne | 709/231 |
| 2002/0107980 A1* | 8/2002 | Kawaguchi | 709/238 |
| 2003/0058857 A1* | 3/2003 | Maher et al. | 370/390 |
| 2005/0083933 A1* | 4/2005 | Fine et al. | 370/390 |
| 2006/0203570 A1* | 9/2006 | Meier et al. | 365/189.05 |
| 2009/0016531 A1* | 1/2009 | Dorfman | 380/275 |
| 2011/0038373 A1* | 2/2011 | Shake et al. | 370/389 |
| 2011/0051727 A1* | 3/2011 | Cai et al. | 370/390 |
| 2012/0106330 A1* | 5/2012 | Davidson | 370/230 |
| 2012/0259722 A1* | 10/2012 | Mikurak | 705/26.1 |
| 2013/0089085 A1* | 4/2013 | Ben-Moshe et al. | 370/338 |

* cited by examiner

*Primary Examiner* — Hassan Phillips
*Assistant Examiner* — Ajay Cattungal
(74) *Attorney, Agent, or Firm* — Fulbright & Jaworski LLP (57) ABSTRACT

Packet cloning logic receives an original stream of packets communicated from a source device. The packet cloning logic generates a plurality of cloned packets for each packet contained in the original stream, wherein the plurality of cloned packets each comprise payload content of a corresponding (or counterpart) packet in the original stream. The packet cloning logic communicates to at least one packet assembly logic, the plurality of cloned packets. The packet assembly logic assembles at least one stream of packets corresponding to the original stream of packets for communication to at least one destination device.

19 Claims, 4 Drawing Sheets

PACKET CLONING FOR ENHANCED DELIVERY OF COMMUNICATION FROM A SOURCE DEVICE TO ONE OR MORE DESTINATION DEVICES

CROSS-REFERENCE TO RELATED APPLICATIONS

This application is related to U.S. patent application Ser. No. 11/403,549, filed Apr. 13, 2006, entitled "SYSTEM AND METHOD FOR TRAVERSING A FIREWALL WITH MULTIMEDIA COMMUNICATION" (now U.S. Pat. No. 7,710,978), U.S. patent application Ser. No. 12/505,268, filed Jul. 17, 2009, entitled "SYSTEMS AND METHODS FOR MANAGEMENT OF NODES ACROSS DISPARATE NETWORKS," and U.S. patent application Ser. No. 12/661,316 filed Mar. 15, 2010 entitled "SYSTEM AND METHOD FOR MULTIMEDIA COMMUNICATION ACROSS DISPARATE NETWORKS," the disclosures of which are hereby incorporated herein by reference.

TECHNICAL FIELD

The following description relates generally to communication between source and destination devices, such as multiparty interactive communication between devices in real time, and more particularly to cloning of packets for enhanced delivery of communication from a source device to one or more destination devices.

BACKGROUND

In conventional communication systems, devices communicate with each other over a communication network, such as a local area network (LAN), the Internet or other wide area network (WAN), a wireless communication network, and/or a combination thereof. A device that is sending information is often referred to as a source (or "sending") device, and a target recipient of the information is often referred to as a destination (or "receiving") device. Of course, during the course of a communication session, the roles of each device may change from time to time. That is, each device may be both a source device at certain times and a destination device at other times. Indeed, in many types of communications each device may be simultaneously assuming both roles of source and destination, such as when performing real-time interactive communication. The source and destination devices may be any type of device capable of communicating information over a communication network in the manner described herein, non-limiting examples of which include personal computers, laptop or notebook computers, mobile computing devices, personal data assistants (PDAs), mobile telephones, and other processor-based communication devices.

Information is often communicated via an Internet Protocol (IP) datagram, which basically includes an IP header and some sort of message or "payload" information to be communicated. A given IP datagram is typically directed to one point of destination from the source device. The IP datagrams are passed through routers and/or other network devices within the communication network for delivery from the source device to the destination device.

As used herein, IP Datagram refers to those datagrams as described in the glossary of RFC 1812 (Requirements for IP Version 4 Routers). In general, an IP Datagram is the unit of end-to-end transmission in the Internet Protocol. An IP Datagram includes an IP header followed by a message (e.g., higher-layer data, such as TCP, UDP, ICMP, and the like). An IP Datagram is composed of one or more IP Fragments.

So, conventionally a source device possesses some information that it wants to communicate to a target destination device. One way of sending that information across the network is via data packets, where the information is broken into smaller packets (or IP datagrams) that are communicated across the network to the destination device. The packets are then received at the destination and reassembled back into the original information.

The Internet Protocol Suite, commonly referred to as TCP/IP, is often used for communicating packets over the Internet and other similar communication networks. Transmission Control Protocol (TCP) is one of the two original components of the suite, complementing the Internet Protocol (IP). TCP provides the service of exchanging data directly between a source device and a destination device on the same network, whereas IP handles addressing and routing messages across one or more networks. In particular, TCP generally provides reliable, ordered delivery of a stream of bytes from a program on a source device (e.g., a first computer) to another program on a destination device (e.g., another computer). In TCP, if a particular message is malformed or does not reach the destination device, then a request might be made to have the source device resend the packet.

TCP is the protocol that many major Internet applications, such as the World Wide Web, e-mail, and file transfer, commonly employ. Other applications, which do not require reliable data stream service (or which are willing to tolerate less reliability in favor of reduced latency), may use the User Datagram Protocol (UDP), which is another member of the Internet Protocol Suite and which provides a datagram service that emphasizes reduced latency over reliability. With UDP, computer applications can send messages, often referred to as datagrams, to other hosts on an IP network without requiring prior communications to set up special transmission channels or data paths.

UDP uses a simple transmission model without implicit hand-shaking dialogues for providing reliability, ordering, or data integrity. Thus, UDP natively provides an unreliable service and datagrams may arrive out of order, appear duplicated, or go missing without notice. UDP assumes that error checking and correction is either not necessary or performed in the application, avoiding the overhead of such processing at the network interface level. Time-sensitive applications often use UDP because dropping packets is preferable to waiting for delayed packets, which may not be an option in a real-time system. If error correction facilities are needed at the network interface level, an application may use the TCP or Stream Control Transmission Protocol (SCTP), which are designed for this purpose.

UDP's stateless nature is also useful for servers answering small queries from huge numbers of clients. Unlike TCP, UDP is compatible with packet broadcast (sending to all on local network) and multicasting (send to all subscribers). Common network applications that use UDP include the Domain Name System (DNS), streaming media applications such as IPTV, Voice over IP (VoIP), Trivial File Transfer Protocol (TFTP), and many online games.

Thus, in many types of communication sessions, such as employed in various multiparty interactive applications, the packets are communicated in a streaming or real-time fashion. For instance, the destination may receive packets that are being streamed and begin outputting the information contained in the received packets while further packets are in route to the destination device. For instance, in many multimedia applications, such as live voice and/or video communication between parties (e.g., videoconferencing, etc.), additional packets are being created at a source device as the destination device is receiving and starting to play previously-received packets.

Particularly with the development and proliferation of the Internet technology and broadband networks, there are increasing numbers of multiparty interactive applications available on the market. Multiparty interactive applications typically enable multiple users to interact in real time. Examples of these applications include, without limitation, videoconferencing, interactive gaming (e.g., Internet gaming), distance learning, and the like. Multiparty interactive applications conventionally employ a communication mechanism in the network layer to manage the transmission of packets between the applications. Typically, only one type of transport protocol is used. For example, a multiparty interactive application may send packets to other applications using TCP mechanisms. As mentioned above, TCP is a reliable protocol for controlled message delivery and requires separate connections for each source-destination pair.

The use of UDP may be a quicker way for multiparty interactive applications to send packets to other applications. However, UDP is connectionless and provides very few error recovery services. Thus, UDP is conventionally viewed as an undesirable transmission mechanism where reliability is a significant requirement or desire.

Multiparty interactive applications may also employ IP multicast to handle data transmission. IP multicast is a method whereby a message can be sent simultaneously to a set of destinations. In general, IP multicast provides a method of sending IP datagrams to a group of interested receivers in a single transmission. It is often employed for streaming media applications on the Internet and private networks.

IP multicast is a technique for one-to-many and many-to-many real-time communication over an IP infrastructure in a network. It scales to a larger receiver population by not requiring prior knowledge of who or how many receivers there are. Multicast uses network infrastructure efficiently by requiring the source to send a packet only once, even if it needs to be delivered to a large number of receivers. Special multicast nodes in the network (typically network switches and routers) take care of replicating the packet to reach multiple receivers such that messages are sent over each link of the network only once.

The most common low-level protocol to use multicast addressing is UDP. As discussed above, UDP is, by its nature, not reliable, i.e., messages may be lost or delivered out of order. Reliable multicast protocols such as Pragmatic General Multicast (PGM) have been developed to add loss detection and retransmission on top of IP multicast.

IP multicast communication often involves use of an IP multicast group address, a multicast distribution tree, and receiver driven tree creation. An IP multicast group address is used by source devices and the receivers to send and receive multicast messages. Source devices use the group address as the IP destination address in their data packets. Receiver devices use this group address to inform the network that they are interested in receiving packets sent to that group. For example, if some content is associated with group 239.1.1.1, the source device will send data packets destined to 239.1.1.1. Receiver devices for that content will inform the network that they are interested in receiving data packets sent to the group 239.1.1.1. The receiver device joins 239.1.1.1. Thus, the receiver devices are required to actively subscribe to a group, and are thus aware of their membership in the group. The protocol typically used by receiver devices to join a group in IP multicasting is called the Internet Group Management Protocol (IGMP).

With routing protocols based on shared trees, once the receiver devices join a particular IP multicast group, a multicast distribution tree is constructed for that group. The protocol most widely used for this is Protocol Independent Multicast (PIM). It sets up multicast distribution trees such that data packets from senders to a multicast group reach all receivers which have joined the group. For example, all data packets sent to the group 239.1.1.1 are received by receiver devices who joined 239.1.1.1. There are variations of PIM implementations: Sparse Mode (SM), Dense Mode (DM), Source Specific Mode (SSM) and Bidirectional Mode (Bidir, or Sparse-Dense Mode, SDM).

IP multicast creates state information per multicast distribution tree in the network. If a router is part of 1000 multicast trees, it has 1000 multicast routing and forwarding entries. On the other hand, a multicast router does not need to know how to reach all other multicast trees in the Internet. It only needs to know about multicast trees for which it has downstream receiver devices.

Thus, IP multicast typically requires specialized routers which understand the protocol and are able to replicate the packets at the appropriate time. So, although IP multicast can be effective in a private network, IP multicast is not practical for nodes in disparate networks to interact in real time over the Internet.

Conventionally, a given source device is required to be aware of each destination device to which it is communicating. For instance, in a videoconference between two devices, A and B, device A is aware of device B and vice-versa. In this situation, as the live video and audio stream from device A is communicated via IP packets that are directed from source device A to destination device B. Likewise, the live video and audio stream from device B is communicated via IP packets directed from source device B to destination device A.

As the number of devices participating in such a videoconference increases, each participating device must be aware of the other participating devices in conventional solutions. For instance, in a videoconference between three devices, A, B, and C, device A is aware of devices B and C, device B is aware of devices A and C, and device C is aware of devices A and B. In this situation, the live video and audio stream from device A is communicated via IP packets that are directed from source device A to destination device B and via IP packets that are directed from source A to destination device C. Thus, device A creates one stream of packets directed toward destination device B, and device A creates another stream of packets directed toward destination device C. Likewise, devices B and C may each create multiple streams of packets that are directed to the other destination devices participating in the live videoconference.

BRIEF SUMMARY

The present invention is directed generally to systems and methods for communication between source and destination devices, and more particularly to systems and methods for cloning of packets for enhanced delivery of communication from a source device to one or more destination devices. The communication may, in certain embodiments, multiparty interactive communication between the devices in real time. Of course, the concepts described herein are not limited in application to interactive communication between devices in real time, but may likewise be employed in various other types of communication.

In certain embodiments packet cloning logic receives an original stream of packets communicated from a source device. The received packets may be IP Datagrams, for example. The packet cloning logic generates a plurality of cloned packets for each packet contained in the original stream, wherein the plurality of cloned packets each comprise payload content of a corresponding (or counterpart) packet in the original stream. The packet cloning logic communicates to at least one packet assembly logic, the plurality of cloned packets. The packet assembly logic assembles at least one stream of packets corresponding to the original stream of packets for communication to at least one destination device. Thus, the assembled stream of packets may be a stream of IP Datagrams, for example.

In certain embodiments, packet cloning/assembly logic is implemented in a system, where such packet cloning/assembly logic is operable to generate a cloned packet stream from a received original stream, as well as assemble from a received cloned packet stream a stream corresponding to a counterpart original stream. Thus, for instance, according to certain embodiments a packet cloning/assembly logic comprises an interface for receiving a first original stream of packets communicated from a source device. Such interface may be a network interface (e.g., provided by a network interface card) or any other suitable interface for receiving a stream of packets output by the source device. The packet cloning/assembly logic further comprises packet cloning logic configured to generate a cloned packet stream containing a plurality of cloned packets for each packet contained in the first original stream of packets that is received, wherein the plurality of cloned packets each comprise payload content of a corresponding packet in the received first original stream of packets. The packet cloning/assembly logic further has an interface (e.g., a network interface or other suitable interface) for communicating, from the packet cloning logic, the cloned packet stream (e.g., for transmission to other packet cloning/assembly logic).

The packet cloning/assembly logic further has an interface (e.g., a network interface or other suitable interface with another packet cloning/assembly logic) for receiving a cloned packet stream containing a plurality of cloned packets for each packet contained in a second original stream of packets. The packet cloning/assembly logic further includes packet assembly logic configured to assemble, from a received cloned packet stream, at least one stream of packets corresponding to the second original stream of packets, and an interface (e.g., network interface or other suitable interface with a communication device) for communicating, from the packet assembly logic, the at least one stream of packets assembled by the packet assembly logic.

Thus, packet cloning logic receives an original stream of packets, and generates therefrom a cloned packet stream that it communicates to assembly logic. The assembly logic receives the cloned packet stream, and performs assembly operations for generating, from the cloned packet stream, a stream of packets corresponding to the original stream of packets that was received by packet cloning logic. Because of the plurality of cloned packets that are communicated in cloned packet stream for each original packet contained in the original stream, the loss of packets between packet cloning logic and assembly logic can be reduced (e.g., virtually eliminated). Thus, the assembly logic can be essentially assured of receiving at least one clone of each of the packets contained in the original stream that was received by the packet cloning logic from a source device.

Further, the assembly logic assembles the packets into their proper sequence/order (as defined in the original stream that was received by the packet cloning logic), thereby effectively recreating the original packet stream as an assembled packet stream. Accordingly, the assembled packet stream contains packets having the same content and arranged in the same relative order/sequence as their counterparts in the original packet stream. Thus, in certain embodiments, while the assembly logic may receive multiple clones of each packet (e.g., the multiple cloned packets), the assembly logic may use the received clone packets to assemble a stream that contains only one of each packet, just as contained in the original stream, and the packets are arranged in the assembled packet stream in the same order/sequence as defined by the original stream.

Accordingly, the packet cloning logic and assembly logic enhance the delivery of communication from a source device to a destination device. For instance, by generating and communicating cloned packets in the cloned packet stream, the packet cloning logic and assembly logic aid in both reducing lost packets occurring during communication and maintaining the order in which the packets are received by the destination device, thereby improving or enhancing the overall quality of the communication received by the destination device.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
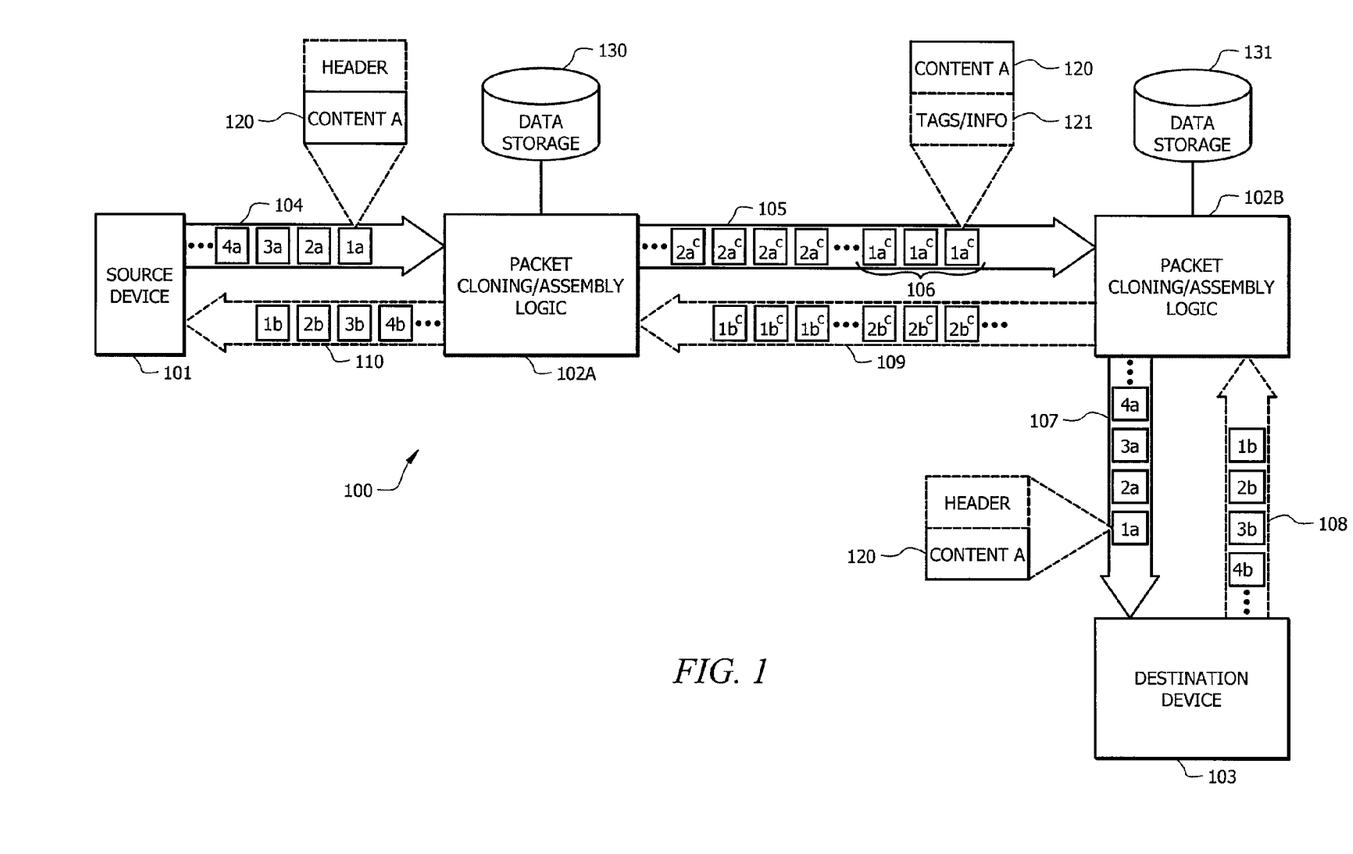
FIG. 1 shows an exemplary system according to one embodiment of the present invention.

FIG. 1 shows an exemplary system 100 according to one embodiment of the present invention. System 100 includes a source device 101 communicating with a destination device 103. Each of source device 101 and destination device 103 may be any type of communication device capable of communicating information over a communication network in the manner described herein, non-limiting examples of which include servers, workstations, personal computers, laptop computers, notebook computers, notepad computers, mobile computing devices, personal data assistants (PDAs), mobile telephones, and other processor-based communication devices. Depending on the granularity of the communication system in which embodiments of the present invention are being deployed, the source device 101 and destination device 103 may, for example, be separate devices residing on a common network (e.g., on a common LAN) or on disparate networks (e.g., across a WAN, such as the Internet), or the source device 101 and destination device 103 may even be separate components residing within a common device which communicate with each other via a communication bus or other communication "network" deployed within the device.

Source device 101 and destination device 103 need not necessarily be the same type of device. In certain embodiments, the source device 101 and destination device 103 are end-user communication devices with which end users interact to communicate with each other, e.g., in real-time via videoconferencing or other multiparty interactive communication. In other embodiments, one or more of source device 101 and destination device 103 may not be an end-user communication device. For instance, one of the source device 101 and destination device 103 may be a managed device of some type, while the other of the source device 101 and destination device 103 may be a management device (e.g., server) for managing the managed device. For instance, in one embodiment, as discussed further below, the source device 101 may be a managed endpoint device and the destination device 103 may be one or more secure endpoint managers, such as those disclosed in the co-pending and commonly-assigned U.S. patent application Ser. No. 12/505,268, filed Jul. 17, 2009, entitled "SYSTEMS AND METHODS FOR MANAGEMENT OF NODES ACROSS DISPARATE NETWORKS," the disclosure of which is incorporated herein by reference.

The communication occurring between source device 101 and destination device 103 may be uni-directional (e.g., only from source device 101 to destination device 103) or it may be bi-directional. In a bi-directional implementation, the source device 101 assumes the role of "source" (or "transmitter") for information that it is outputting (i.e., communicating to destination device 103), and the source device 101 assumes the role of a "destination" (or "receiver") for information that it receives from destination device 103. In other words, in a bi-directional communication scenario, each of source device 101 and destination device 103 may simultaneously assume roles of both a source (or transmitter) and destination (or receiver). Further, the uni-directional or bi-directional communication may, in certain embodiments, be performed in substantially real time, such as is common for many voice over IP (VoIP), videoconferencing, interactive gaming, and/or other applications, whereby information is communicated from a source device to a destination device as it is generated at the source device. In many instances, the communication is performed via a streaming communication protocol, such as UDP, Real-time Streaming Protocol (RTSP), Real-time Transport Protocol (RTP), or Real-time Control Protocol (RTCP), as examples. Further, while a single source device 101 and destination device 103 are shown for ease of illustration and discussion in FIG. 1, in many scenarios a plurality of source devices and/or destination devices may be implemented for communicating with each other, such as discussed further below with the exemplary embodiment of FIG. 2.

In communicating information from source device 101 to destination device 103, source device 101 generates and outputs information in data packets or datagrams. As used herein, a packet or datagram refers generally to a portion or chunk of information. Data packets are commonly used in communicating information over communication networks via a communication protocol, such as TCP/IP, UDP, etc. In the illustrated example, source 101 outputs a stream 104 of packets 1a, 2a, 3a, 4a, and so on. As shown in FIG. 1 for packet 1a, each packet contains content 120, which may be referred to as the packet's payload, and the packet may further include a header and/or other information that is used by the communication protocol (e.g., for routing of the packet, etc.). The stream 104 of packets 1a, 2a, 3a, . . . output by source device 101 may be output via any communication protocol natively supported by source device 101, such as UDP, TCP/IP, etc.

For many applications, particularly for real-time or live applications, such as many multiparty interactive applications, it is generally desirable for destination device 103 to receive a high number (e.g., preferably all) of the transmitted packets in stream 104 in sequence. That is, it is desirable to have a low loss in the transmitted packets (e.g., such that most or all of the packets transmitted by source device 101 are received by destination device 103), and it is desirable for destination device 103 to receive the transmitted packets in sequence, e.g., receive packet 1a, followed by packet 2a, followed by packet 3a, and so on in the example of FIG. 1.

In accordance with embodiments of the present invention packet cloning/assembly logic is employed to enhance the delivery of communication from source device 101 to destination device 103. As discussed further herein, the packet cloning/assembly logic may be implemented to aid in both reducing lost packets occurring during communication and maintaining the order in which the packets are received by the destination device 103, thereby improving or enhancing the overall quality of the communication received by destination device 103.

As shown in the example of FIG. 1, a first packet cloning/assembly logic 102A and a second packet cloning/assembly logic 102B are implemented in the communication path between source device 101 and destination device 103. Because they are implemented in the communication path between the endpoints where the communication originates (e.g., in source device 101) or terminates (e.g., in destination device 103), the packet cloning/assembly logic 102A and 102B may be referred to herein as intermediate logic (or "intermediate devices"). As an example of operation of one embodiment, first packet cloning/assembly logic 102A receives the stream of packets 104 from source device 101, and outputs a stream of packets 105 to second packet cloning/assembly logic 102B. The output stream of packets 105 may be referred to herein as a "cloned packet stream" because it contains cloned packets generated by packet cloning/assembly logic 102B as discussed further hereafter.

In the communication from source device 101 to destination device 103, packet cloning/assembly logic 102A performs packet cloning operations for generating cloned packet stream 105 (and thus for this direction of communication, logic 102A may be referred to as "packet cloning logic"). Further, in the communication from source device 101 to destination device 103, packet cloning/assembly logic 102B receives the cloned packet stream 105 and performs assembly operations for generating from the cloned packet stream 105 a stream 107 of packets corresponding to the original stream of packets 104 received by packet cloning logic 102A from source device 101 (and thus for this direction of communication, logic 102B may be referred to as "assembly logic"). Of course, for bi-directional communication each of logic 102A and 102B assume both the roles of packet cloning logic and assembly logic.

In general, as used herein, a "cloned" packet refers to a packet that contains the same content or payload as another "original" packet from which it is cloned. For instance, as discussed further herein, a cloned packet $1a^c$ that is cloned from an original packet $1a$ contains the same content or payload 120 as the original packet $1a$. In accordance with embodiments of the present invention, a plurality of such cloned packets may be generated by packet cloning logic 102A for each of the "original" packets received from source device 101 (via stream 104). For instance, for original packet $1a$ transmitted in stream 104 from source device 101, packet cloning logic 102A may generate a plurality of cloned packets $1a^c$ 106. In the example of FIG. 1, packet cloning logic 102A generates cloned packets 106 for packet $1a$, each of which are designated $1a^c$ (where the "c" superscript represents it as a "cloned" packet). While three (3) cloned packets $1a^c$ are shown as contained in the cloned packet stream 105 output by packet cloning logic 102A in the example of FIG. 1, any number of such cloned packets may be included for each original packet. Further, in certain embodiments, the cloned packet stream 105 may also include the original packet $1a$. For instance, original packet $1a$ may be transmitted followed by the plurality of cloned packets ($1a^c$) 106.

As shown for one of the cloned packets $1a^c$ in FIG. 1, the cloned packets contain the same content or payload as their original packet counterpart. For instance, cloned packet $1a^c$ includes the same content 120 as original packet $1a$ that was received by logic 120A from source device 101 via stream 104. Further, the cloned packets may also contain the header and/or other information contained in its original packet counterpart.

In certain embodiments, the cloned packets may further contain additional information (e.g., tags) 121 that are inserted by packet cloning logic 102A. Examples of the additional information 121 that may be so included in the cloned packets in certain embodiments, as well as how such additional information might be used by the packet cloning logic 102A/102B, are described further below. Additionally or alternatively, in certain embodiments the cloned packets (e.g., packets $1a^c$) may have added security beyond that natively generated for the original packets by source device 101 (e.g., encryption or other security may be employed in generating cloned packet stream 105 by packet cloning logic 102A and decryption may be employed by assembly logic 102B). Also, as described further herein, in certain embodiments the packet cloning logic 102A may store, at least for some period of time, some or all of the original packet $1a$ and generated cloned packets $1a^c$ to a data storage device 130. Data storage device 130 may be any computer-readable data storage device, such as a hard drive, memory, magnetic storage device, optical storage device, etc. as examples.

Continuing with the operation of the exemplary system 100 of FIG. 1, assembly logic 102B receives the cloned packet stream 105. In certain embodiments, the assembly logic 102B may store, at least for some period of time, some or all of the packets received via cloned packet stream 105 to a data storage device 131. As with data storage device 130, data storage device 131 may be any computer-readable data storage device, such as a hard drive, memory, magnetic storage device, optical storage device, etc. as examples.

Assembly logic 102B performs assembly operations for generating, from the cloned packet stream 105, a stream 107 of packets corresponding to the original stream of packets 104 that was received by packet cloning logic 102A from source device 101. Because of the plurality of cloned packets that are communicated in cloned packet stream 105 for each original packet contained in the original stream 104, the loss of packets between packet cloning logic 102A and packet assembly logic 102B can be reduced (e.g., virtually eliminated). Thus, packet assembly logic 102B can be essentially assured of receiving at least one clone of each of the packets contained in the original stream 104 that was received by packet cloning logic 102A from source device 101. Further, packet assembly logic 102B assembles the packets into their proper sequence/order, thereby effectively recreating the original packet stream 104 as assembled packet stream 107. As shown in the example of FIG. 1, the assembled packet stream 107 contains the packets $1a$, $2a$, $3a$, $4a$, and so on, each of which contains the same content/payload as their counterpart in the original packet stream 104 (e.g., as shown for packet $1a$ in assembled stream 107, it contains content 120 as in packet $1a$ of original stream 104), and the packets in the assembled packet stream 107 have the same relative order/sequence as their counterparts in the original packet stream 104 (e.g., packet $1a$ followed by packet $2a$, and so on).

Thus, in certain embodiments, while packet assembly logic 102B may receive multiple clones of each packet (e.g., the multiple cloned packets $1a^c$ 106), packet assembly logic 102B may use the received clone packets to assemble stream 107 that contains only one of each packet, just as contained in the original stream 104, and the packets are arranged in the assembled packet stream 107 in the same order/sequence as defined by original stream 104. Moreover, in certain embodiments, the packet cloning/assembly devices/operations are transparent to the source and destination devices. For instance, the source device 101 and destination device 103 may be completely unaware of the generation of the cloned packet stream 105 that is used for communication between the intermediate packet cloning/assembly logic 102A and 102B. Instead, it may appear to the source device 101 and destination device 103 that a native stream 104 that is generated and output by source device 101 is received by destination device 103 with no intermediate cloning operations occurring.

As discussed above, the packet cloning logic 102A and assembly logic 102B enhance the delivery of communication from source device 101 to destination device 103. For instance, by generating and communicating cloned packets in the cloned packet stream 105, the packet cloning logic 102A and assembly logic 102B aid in both reducing lost packets occurring during communication and maintaining the order in which the packets are received by the destination device 103, thereby improving or enhancing the overall quality of the communication received by destination device 103. Consider, for example, a scenario where logic 102A is disposed relatively near (along the communication path) to source device 101 and logic 102B is disposed relatively near (along the communication path) to destination device 103, and further suppose that source device 101 and destination device 103 are disposed relatively far from each other (e.g., across a WAN and/or disposed on disparate local networks that may be coupled via a WAN); in such an exemplary scenario, the relatively long-haul communication occurring between logic 102A and 102B (e.g., across the WAN) is enhanced by the use of cloned packet stream 105, thereby improving the overall quality of the communication between the endpoint devices 101 and 103 over what would likely be encountered by mere use of their native protocol for the long-haul communication. For instance, if UDP is natively employed for the communication between the source device 101 and destination device 103, many of the packets in the stream may be dropped or received out of order at the destination device 103, thereby reducing the quality of the communication received/output by destination device 103. The above-mentioned use of cloned packet stream 105 can enhance the overall quality of the communication by increasing the number of packets that are received in sequence at the destination device 103.

Thus, as discussed above, in certain embodiments packet cloning logic 102A receives an original stream of packets 104 communicated from a source device 101. The packet cloning logic 102A generates a plurality of cloned packets for each packet contained in the original stream (e.g., the plurality of cloned packets $1a^c$ 106 for original packet 1a), wherein the plurality of cloned packets each comprise payload content of a corresponding (or counterpart) packet in the original stream (e.g., each cloned packet $1a^c$ contains content/payload 120 of counterpart original packet 1a). The packet cloning logic communicates to at least one packet assembly logic 102B, the plurality of cloned packets (e.g., in cloned packet stream 105). The packet assembly logic 102B assembles at least one stream of packets (e.g., stream 107) corresponding to the original stream of packets 104 for communication to at least one destination device 103.

While an example of the operation for communication flowing from source device 101 to destination device 103 is discussed above, in certain bi-directional communication applications communication may be concurrently flowing from destination device 103 to source device 101. For instance, destination device 103 may also assume the role of a source which is transmitting an original packet stream 108 containing packets 1b, 2b, 3b, 4b, and so on. Packet cloning/assembly logic 102B receives the stream 108 and acts as packet cloning logic (in a manner similar to that discussed above for logic 102A in processing received stream 104 from source device 101) to generate cloned packets and output a cloned packet stream 109 to packet cloning/assembly logic 102A. Packet cloning/assembly logic 102A receives the cloned packet stream 109 and acts as assembly logic (in a manner similar to that discussed above for logic 102B in processing received cloned packet stream 105) to assemble, from the cloned packet stream 109, a stream of packets 110 corresponding to the original packet stream 108 from device 103 for transmission to device 101.

Thus, in certain embodiment each of the packet cloning/assembly logic 102A and 102B is operable to generate a cloned packet stream from a received original stream, as well as assemble from a received cloned packet stream a stream corresponding to a counterpart original stream. That is, each of the packet cloning/assembly logic 102A and 102B may contain both packet cloning logic and assembly logic.

Thus, for instance, according to certain embodiments a packet cloning/assembly logic 102A comprises an interface for receiving a first original stream of packets 104 communicated from a source device 101. Such interface may be a network interface (e.g., provided by a network interface card) or any other suitable interface for receiving a stream of packets 104 output by source device 101. The packet cloning/assembly logic 102A further comprises packet cloning logic configured to generate a cloned packet stream 105 containing a plurality of cloned packets for each packet contained in the first original stream of packets 104 that is received, wherein the plurality of cloned packets each comprise payload content of a corresponding packet in the received first original stream of packets 104 (e.g., each cloned packet $1a^c$ contains content/payload 120 of counterpart original packet 1a). The packet cloning/assembly logic 102A further has an interface (e.g., a network interface or other suitable interface with packet cloning/assembly logic 102B) for communicating, from the packet cloning logic, the cloned packet stream 105 (e.g., for transmission to packet cloning/assembly logic 102B).

The packet cloning/assembly logic 102A further has an interface (e.g., a network interface or other suitable interface with packet cloning/assembly logic 102B) for receiving a cloned packet stream 109 containing a plurality of cloned packets for each packet contained in a second original stream of packets 108. The packet cloning/assembly logic 102A further includes packet assembly logic configured to assemble, from a received cloned packet stream 109, at least one stream of packets 110 corresponding to the second original stream of packets 108, and an interface (e.g., network interface or other suitable interface with source device 101) for communicating, from the packet assembly logic, the at least one stream of packets 110 assembled by the packet assembly logic.

Packet cloning/assembly logic 102A and 102B may be implemented in hardware, software, firmware, or a combination thereof on one or more devices. For instance, in one embodiment packet cloning/assembly logic 102A is implemented on a first device (e.g., a server, router, or other processor-based device) and packet cloning/assembly logic 102B is implemented on a separate device (e.g., another server, router, or other processor-based device). For example, packet cloning/assembly logic 102A may be implemented in a device that is disposed relatively close (in the communication path) to source device 101, while packet cloning/assembly logic 102B may be implemented in a device that is disposed relatively close (in the communication path) to destination device 103. Thus, the cloned packet streams 105 and 109 may, in certain embodiments, be used for transmission of the communication over a relatively long portion of the communication path between source device 101 and destination device 103. For instance, in certain embodiments, the cloned packet streams 105 and 109 are communicated over the Internet or other WAN, a LAN, and/or other communication network over which the communication between source device 101 and destination device 103 travels.

While shown as separate blocks for ease of illustration and discussion in FIG. 1, in certain embodiments, packet cloning/assembly logic 102A may be implemented within source device 101, and/or packet cloning/assembly logic 102B may be implemented within destination device 101. Thus, for instance, a communication application (e.g., a multiparty interactive application) executing on source device 101 may natively output stream 104 and may expect to natively receive an input stream 110. Packet cloning/assembly device 102A may be implemented within source device 101 in the communication path to receive/intercept the output 104 to generate the cloned packet stream 105. Similarly, packet cloning/assembly device 102A may be implemented within source device 101 in the communication path to receive/intercept the incoming cloned packet stream 109 and generate the assembled packet stream 110 (which may then be supplied to the native communication application of source device 101).

In certain embodiments, packet cloning/assembly logic 102A and 102B may even be implemented within a common device to, for example, facilitate enhanced communication between various components or modules of the common device. Thus, for instance, source device 101 may be a first component within a common device, and destination device 103 may be another component within the common device, wherein the packet cloning/assembly logic 102A and 102B may be deployed for enhancing communication between such devices/components 101 and 103 in the manner discussed above. Thus, depending on the granularity of the system in which they are deployed, the devices 101 and 103 and/or the packet cloning/assembly logic 102A and 102B may reside on disparate networks, on common local networks, or even within a common device. The above-mentioned interfaces implemented in the packet cloning/assembly logic may thus be network interfaces, communication bus interfaces, and/or other suitable interfaces for sending and/or receiving the packets via the "network" over which such packets travel.

In certain embodiments, the packet cloning/assembly logic 102A and 102B each comprises a processor-based system, which may include a computer-executable software application executing thereon (e.g., for performing the operations described further herein as being performed by such logic). The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein (such as the operations of packet cloning/assembly logic described herein) may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC, in certain embodiments.

Thus, in one or more exemplary designs, the functions described may be implemented in hardware, software, firmware, or any combination thereof. If implemented in software, the functions may be stored as one or more instructions or code on a computer-readable medium which are processed/executed by one or more processors.

As mentioned above, in certain embodiments, the source and destination devices 101, 103 need not be aware of the operations of packet cloning/assembly logic 102A, 102B. In certain embodiments, the source and destination devices 101, 103 need not even be aware of the existence of such logic 102A, 102B in the communication path. To each endpoint, the communication appears to be as natively supported by such endpoint device. For instance, the source device 101 merely outputs a native stream of packets 104 (e.g., as may be natively generated by a communication application, such as a videoconferencing application, etc.), and the destination device 103 receives stream 107 that corresponds to such native stream 104. Thus, the native communication supported by source device 101 and destination device 103 need not be revised in any way in certain embodiments, as the cloned packet streams 105 and 109 (that are employed between the packet cloning/assembly logic 102A and 102B) are transparent to such endpoint devices. In certain embodiments, the source device 101 and/or destination device 103 is unaware of its communication with another endpoint device. For example, the source device 101 is not required to subscribe to a multicast group and/or is not required to direct its communication to a predefined group address whereby it is aware of the communication being directed to members of such group.

In certain embodiments, the source device(s) and/or destination device(s) involved in a given communication session may be part of a communication community. Such communication community may be formed by the devices registering with an intermediate server, for example. For instance, in certain embodiments, a communication community may be formed as described further in U.S. patent application Ser. No. 12/661,316 filed Mar. 15, 2010 entitled "SYSTEM AND METHOD FOR MULTIMEDIA COMMUNICATION ACROSS DISPARATE NETWORKS," the disclosure of which is incorporated herein by reference.

In certain embodiments, various additional information/tags might be included in the cloned packets (e.g., as tags/info 121). Such additional information may be inserted into the cloned packets when being formed by packet cloning logic 102A, for example, and the information may be used in various ways by cloning/assembly logic 102A and/or 102B. In one embodiment, each cloning/assembly logic device 102A-102B has a unique identifier within a given communication community, where such identifier is used for routing. Another tag that may be included is Priority. Other tags may be included to describe route conditions, authentication information, and/or database updates for the community.

In one embodiment, every original packet, regardless of whether it is a request or response, is marked with a unique identifier, which may be referred to as a "DPO-ID" (which may include a timestamp, alpha-numeric symbol, and the like) and "held" or "stored" until which time it is "replicated" or "cloned." The cloned packet is then given an additional or new unique identifier, which may be referred to as a "DPC-ID" (which may include a timestamp, alpha-numeric symbol, and the like) and "held" or "stored." This new or additional unique identifier may contain information imperative to the mechanics of organizing, sorting, assembling, routing, and source and destination information for the delivery of each and every packet.

A "DPC-ID" may have a form of "timestamp" or the like relative to the internal time code of the cloning/assembly logic. For example, this "timestamp" may be used to discern the length of time these "replicates" or "clones" should be "held" or "stored". A "DPC-ID" may also include an "alpha-numeric symbol" or the like. For example, such an "alpha-numeric symbol" may be used to distinguish how the "DPC-ID" may be organized in the storage facility. Another example of its use may be to evaluate information relative to user preferences or predetermined environmental variables, as well as proprietary information pertinent to the internal routing and messaging between various cloning/assembly logic.

Figure 2:
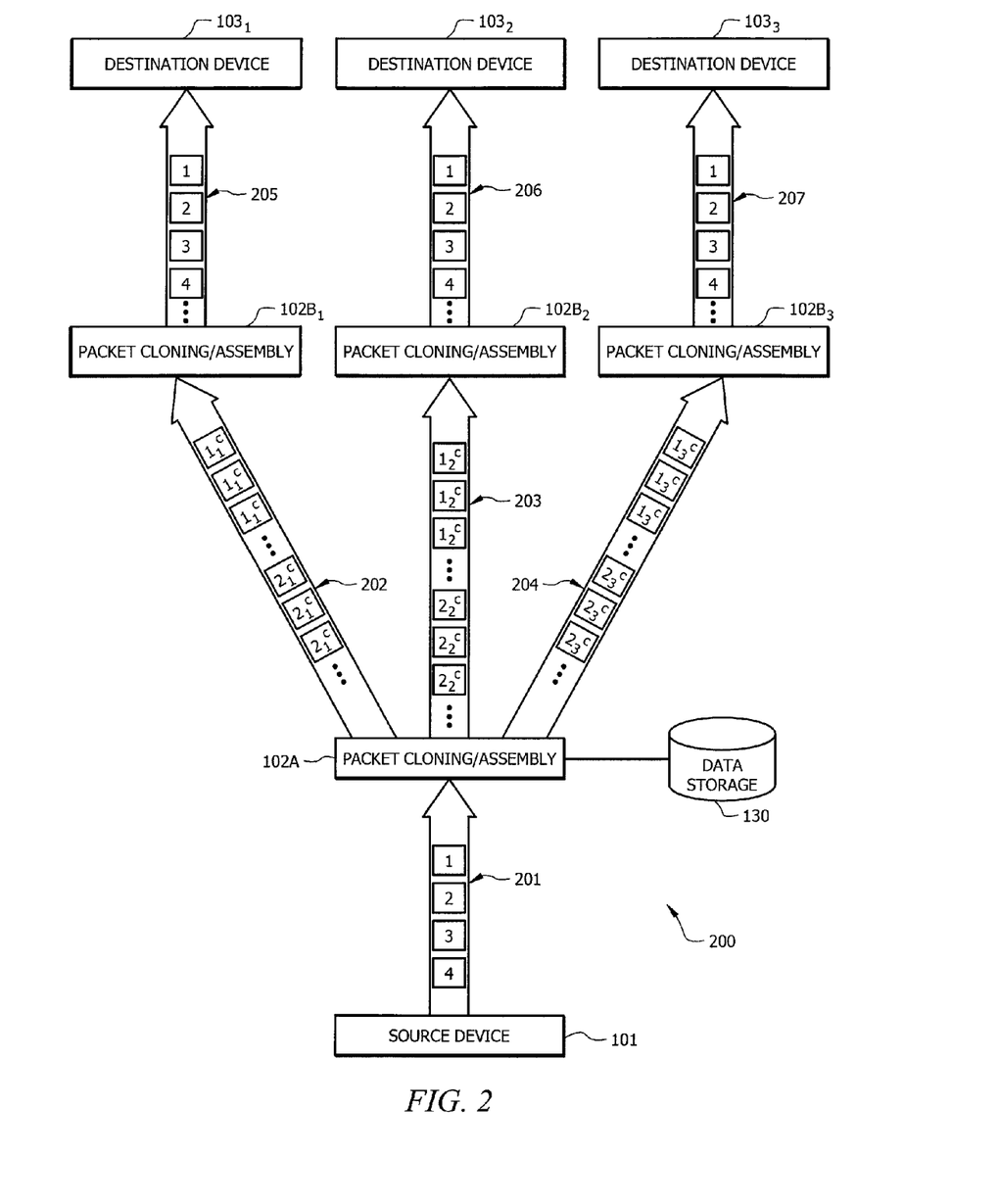
FIG. 2 shows another exemplary system according to an embodiment of the present invention.

While FIG. 1 shows an example of a packet cloning/assembly logic enhancing communication between a single source device 101 and destination device 103, in certain embodiments such packet cloning/assembly logic may be employed to enhance communication between more than two devices, such as between a source device and a plurality of destination devices. Turning now to FIG. 2, another exemplary system 200 is shown. In this example, a source device 101 and a plurality of different destination devices $103_1$, $103_2$, and $103_3$ are included. Source device 101 outputs a stream of packets 201 that is delivered to each of destination devices 103$_1$-103$_3$. Further, in this example, a packet cloning/assembly logic 102A is again implemented, and a plurality of packet cloning/assembly logic 102B$_1$, 102B$_2$, and 102B$_3$ are implemented.

In the communication from source device 101 to destination devices 103$_1$-103$_3$, packet cloning/assembly logic 102A performs packet cloning operations for generating cloned packet streams 202, 203, and 204 (and thus for this direction of communication, logic 102A may be referred to as "packet cloning logic"). Further, in the communication from source device 101 to destination devices 103$_1$-103$_3$, packet cloning/assembly logic 102B$_1$ receives the cloned packet stream 202, packet cloning/assembly logic 102B$_2$ receives the cloned packet stream 203, and packet cloning/assembly logic 102B$_3$ receives the cloned packet stream 204, and each of packet cloning/assembly logic 102B$_1$-102B$_3$ performs assembly operations for generating from their respective received cloned packet stream a stream (205, 206, and 207) of packets corresponding to the original stream of packets 201 received by packet cloning logic 102A from source device 101 (and thus for this direction of communication, logic 102B$_1$-102B$_3$ may each be referred to as "assembly logic").

Of course, for bi-directional communication each of logic 102A and 102B$_1$-102B$_3$ may assume both the roles of packet cloning logic and assembly logic. For instance, while a uni-directional stream of communication from source device 101 to destination devices 103$_1$-103$_3$ is shown for ease of illustration and description in FIG. 2, for many applications all of the devices may be both receiving communication from each of the other devices, as well as transmitting communication to each of the other devices concurrently. For example, in many multi-party interactive applications, such as videoconferencing, gaming, etc., each of the devices 101 and 103$_1$-103$_3$ may be engaging in bi-directional communication with each of the other ones of the devices.

In the example illustrated in FIG. 2, packet cloning logic 102A not only generates cloned packets for creating a single cloned packet stream (as in the exemplary cloned packet stream 105 of FIG. 1), but it creates multiple cloned packet streams 202-204. For instance, as an example of operation of this embodiment, packet cloning logic 102A receives the original stream of packets 201 from source device 101, and generates/outputs a first cloned packet stream 202 to assembly logic 102B$_1$, a second cloned packet stream 203 to assembly logic 102B$_2$, and a third cloned packet stream 204 to assembly logic 102B$_3$. Of course, while three (3) exemplary cloned packet streams 202-204 are shown in this example, any number of such cloned packet streams may be likewise generated for communication with any number of assembly logic 102B (and thus with any number of destination devices 103).

Further, while a single destination device is shown as coupled with each of the assembly logic 102B$_1$-102B$_3$ in this example, in certain embodiments a single packet cloning/assembly logic may be coupled to a plurality of endpoint devices. For instance, rather than a packet cloning/assembly logic 102B$_1$ and 102B$_2$ being implemented for destination devices 103$_1$ and 103$_2$, respectively, in one implementation packet cloning/assembly logic 102B$_1$ may be coupled to both of destination devices 103$_1$ and 103$_2$. For example, destination devices 103$_1$ and 103$_2$ may reside on a common LAN, and packet cloning/assembly logic 102B$_1$ may be coupled to (or reside on) such LAN. Thus, in such an exemplary implementation the assembly logic 102B$_1$ may receive a single cloned packet stream 202, as shown, and assembly logic 102B$_1$ may generate therefrom both of streams 205 and 206 for sending to destination devices 103$_1$ and 103$_2$, respectively. Similarly, in bi-directional communication, packet cloning/assembly logic 102B$_1$ may receive streams from each of devices 103$_1$ and 103$_2$, and generate corresponding cloned packet streams for each of the respective received streams for communication to the other packet cloning/assembly logic (e.g., 102A, 102B$_2$, and/or 102B$_3$) that is servicing one or more endpoint devices in a given communication session.

In the example illustrated in FIG. 2, the original stream of packets 201 received by packet cloning logic 102A includes packets 1, 2, 3, and 4. Packet cloning logic 102A generates a first cloned packet stream 202 that comprises a plurality of cloned packets for each of the packets contained in the original stream of packets 201. For instance, first cloned packet stream 202 includes a plurality of cloned packets $1_1^c$ from the packet 1 contained in the received original stream of packets 201. In this instance, the subscript "1" is employed to indicate that the cloned packet is included in the first cloned packet stream directed to assembly logic 102B$_1$, and the superscript "c" is used to indicate that the packet is a cloned packet. While three (3) cloned packets $1_1^c$ are shown as contained in the first cloned packet stream 202 output by packet cloning logic 102A in the example of FIG. 2, any number of such cloned packets may be included for each original packet. Following the plurality of cloned packets $1_1^c$ generated from the original packet 1 from stream 201, a plurality of cloned packets $2_1^c$ are included in the cloned packet stream 202, which are generated from the original packet 2 from stream 201, and so on.

In this example, packet cloning logic 102A further generates a second cloned packet stream 203 that comprises a plurality of cloned packets for each of the packets contained in the original stream of packets 201. For instance, second cloned packet stream 203 includes a plurality of cloned packets $1_2^c$ from the packet 1 contained in the received original stream of packets 201. In this instance, the subscript "2" is employed to indicate that the cloned packet is included in the second cloned packet stream 203 directed to assembly logic 102B$_2$, and the superscript "c" is used to indicate that the packet is a cloned packet. While three (3) cloned packets $1_2^c$ are shown as contained in the second cloned packet stream 203 output by packet cloning logic 102A in the example of FIG. 2, any number of such cloned packets may be included for each original packet. Following the plurality of cloned packets $1_2^c$ generated from the original packet 1 from stream 201, a plurality of cloned packets $2_2^c$ are included in the cloned packet stream 203, which are generated from the original packet 2 from stream 201, and so on.

In this example, packet cloning logic 102A further generates a third cloned packet stream 204 that comprises a plurality of cloned packets for each of the packets contained in the original stream of packets 201. For instance, third cloned packet stream 204 includes a plurality of cloned packets $1_3^c$ from the packet 1 contained in the received original stream of packets 201. In this instance, the subscript "3" is employed to indicate that the cloned packet is included in the third cloned packet stream 204 directed to assembly logic 102B$_3$, and the superscript "c" is used to indicate that the packet is a cloned packet. While three (3) cloned packets $1_3'$ are shown as contained in the third cloned packet stream 204 output by packet cloning logic 102A in the example of FIG. 2, any number of such cloned packets may be included for each original packet. Following the plurality of cloned packets $1_3^c$ generated from the original packet 1 from stream 201, a plurality of cloned packets $2_3^c$ are included in the cloned packet stream 204, which are generated from the original packet 2 from stream 201, and so on.

Thus, in the example, of FIG. 2, packet cloning logic 102A may be providing multiple concurrent cloned packet streams 202-204 for supporting concurrent communication from source device 101 to the multiple destination devices $103_1$-$103_3$. As discussed further herein, in certain embodiments, the packets may be stored to data storage 130, and one or more of the cloned packet streams 202-204 that are used for communication (via a corresponding assembly logic $102B_1$-$102B_3$) with a destination device $103_1$-$103_3$ may occur at a later time (e.g., after a communication session during which source device 101 originally generates/communicates the stream 201 has ended).

For instance, in one embodiment, a live real-time communication session may occur at a first point in time, during which source device 101 may generate/output stream 201 for communication to destination devices $103_1$ and $103_2$. During such live real-time communication session, packet cloning/assembly logic 102A generates cloned packet streams 202 and 203 for communication to packet cloning/assembly logic $102B_1$ and $102B_2$, respectively, as discussed above. In addition, the packet cloning/assembly logic 102A may store the original stream 201 and/or one or more of the cloned packet streams 202-203 to data storage 130. Then, at some point after the live real-time communication session between source device 101 and destination devices $103_1$ and $103_2$ has ended, packet cloning/assembly logic 102A may recall the stream from data storage 130 and communicate the stream to destination device $103_3$. Thus, a later communication session may be initiated (e.g., by packet cloning/assembly logic 102A or some other communication device that is coupled to cloning/assembly logic 102A) without the knowledge or participation of source device 101 being required, wherein all or a portion of the stream 201 captured from the earlier communication session is communicated to destination device $103_3$. In doing so, packet cloning/assembly logic 102A may generate from the original stream 201 (stored to data storage 130) cloned packet stream 204, and packet cloning/assembly logic $102B_3$ may generate from the cloned packet stream 204 stream 207 for communication to destination device $103_3$.

Continuing with the operation of the exemplary system 200 of FIG. 2, assembly logic $102B_1$ receives the first cloned packet stream 202. Assembly logic $102B_1$ performs assembly operations for generating, from the first cloned packet stream 202, a stream 205 of packets corresponding to the original stream of packets 201 that was received by packet cloning logic 102A from source device 101. Because of the plurality of cloned packets that are communicated in cloned packet stream 202 for each original packet contained in the original stream 201, the loss of packets between packet cloning logic 102A and packet assembly logic $102B_1$ can be reduced (e.g., virtually eliminated). Thus, packet assembly logic $102B_1$ can be essentially assured of receiving at least one clone of each of the packets contained in the original stream 201 that was received by packet cloning logic 102A from source device 101. Further, packet assembly logic $102B_1$ assembles the packets into their proper sequence/order, thereby effectively recreating the original packet stream 201 as assembled packet stream 205. As shown in the example of FIG. 2, the assembled packet stream 205 contains the packets 1, 2, 3, 4, and so on, each of which contain the same content/payload as their counterpart in the original packet stream 201, and the packets in the assembled packet stream 205 have the same relative order/sequence as their counterparts in the original packet stream 201 (e.g., packet 1 followed by packet 2, and so on). Thus, in certain embodiments, while packet assembly logic $102B_1$ may receive multiple clones of each packet (e.g., the multiple cloned packets $1_1{}^c$), packet assembly logic $102B_1$ may use the received clone packets to assemble stream 205 that contains only one of each packet, just as contained in the original stream 201, and the packets are arranged in the assembled packet stream 205 in the same order/sequence as defined by original stream 201.

Similarly, assembly logic $102B_2$ receives the second cloned packet stream 203, and performs assembly operations for generating, from the second cloned packet stream 203, a stream 206 of packets corresponding to the original stream of packets 201 that was received by packet cloning logic 102A from source device 101. And, assembly logic $102B_3$ receives the third cloned packet stream 204, and performs assembly operations for generating, from the third cloned packet stream 204, a stream 207 of packets corresponding to the original stream of packets 201 that was received by packet cloning logic 102A from source device 101.

Assembly logic $102B_1$ transmits its assembled packet stream 205 to destination device $103_1$. Similarly, assembly logic $102B_2$ transmits its assembled packet stream 206 to destination device $103_2$, and assembly logic $102B_3$ transmits its assembled packet stream 207 to destination device $103_3$.

While a single flow of communication from source device 101 to destination devices $103_1$-$103_3$ is discussed above, it should be recognized that bi-directional (or multi-directional) communication may be occurring between one or more (e.g., all) of the devices 101 and $103_1$-$103_3$. For instance, each of the destination devices may be outputting a stream of packets that is communicated to source device 101 and/or to the other destination devices. The packet cloning/assembly logic 102A and $102B_1$-$102B_3$ may thus perform the corresponding operations for packet cloning and assembly to enhance such bi-directional (or multi-directional) communication between the various devices.

Figure 3:
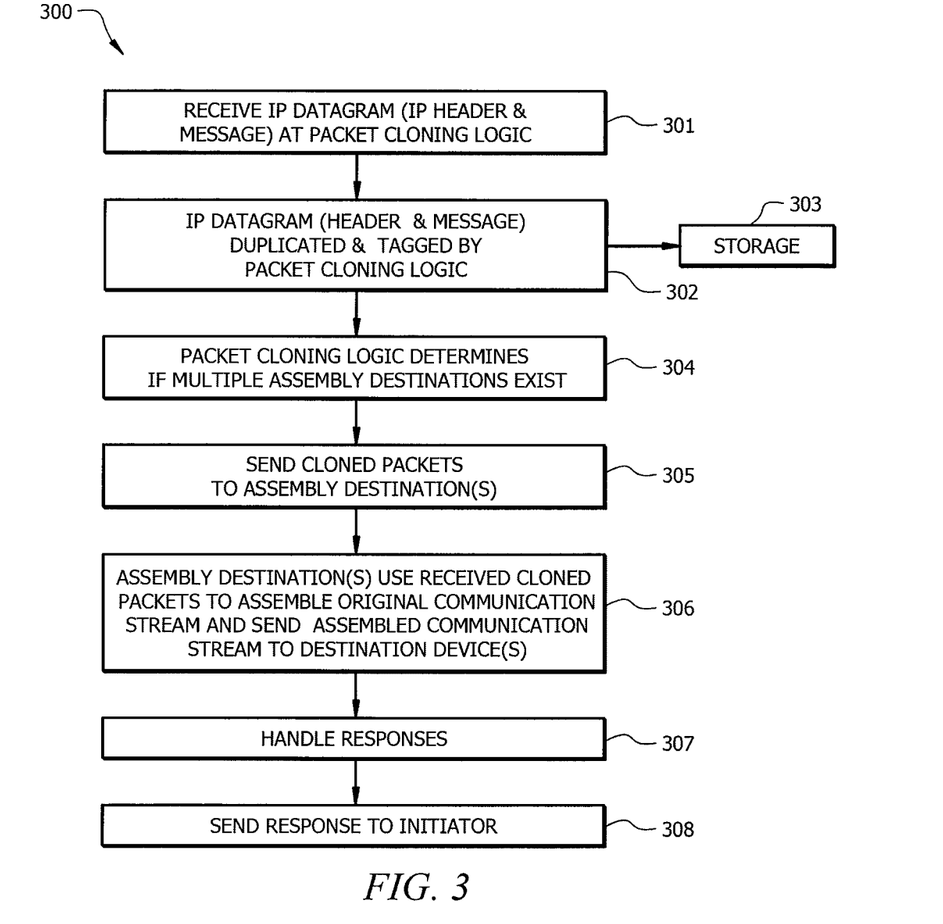
FIG. 3 shows an exemplary operational flow according to one embodiment of the present invention.

FIG. 3 shows an exemplary operational flow 300 according to one embodiment of the present invention. In operational block 301, packet cloning logic receives an IP datagram (or packet). For instance, in the example of FIGS. 1-2, packet cloning logic 102A receives a packet from a source device 101. In block 302, the packet cloning logic 102A generates cloned packets for the received packet, e.g., by duplicating the received packet payload (and header) and adding additional information (e.g., tags). In block 303, the packet cloning logic 102A may store the original received packet and/or one or more of the generated cloned packets.

In block 304, the placket cloning logic determines whether multiple assembly destinations exist, such as the multiple assembly logic destinations $102B_1$-$102B_3$ in the example of FIG. 3. The packet cloning logic may determine whether there are multiple assembly destinations that the received packet is to be delivered in any of various ways.

In one embodiment, destinations are predefined and stored in a database or storage medium which can be accessed by the cloning/assembling logic as needed. For instance, the destinations for a given communication community may be predefined via a registration process employed for registering various endpoints with a given communication community, such as via the registration process described further in U.S. patent application Ser. No. 12/661,316 filed Mar. 15, 2010 entitled "SYSTEM AND METHOD FOR MULTIMEDIA COMMUNICATION ACROSS DISPARATE NETWORKS," the disclosure of which is incorporated herein by reference. The routing of destinations can be determined in several ways. One example is keying off destination information found in the original packets sent by the initiating (or source) device. Relating that information to a series of comparison tables located on each cloning/assembly logic and searching for the most logical destination. Another example is a combination of both the first example and a set of predetermined user-defined parameters that can be set and/or modified at any time by an administrator on the cloning/assembly logic.

In block 305, the packet cloning logic generates a cloned packet stream for each of the determined assembly destinations, and communicates a plurality of cloned packets for each original received packet in the cloned packet stream(s). In block 306, the assembly destinations (or assembly logic) receive the cloned packets and use those received cloned packets to assemble a communication stream corresponding to the original communication stream received by the packet cloning logic, and the assembly destination(s) send the assembled communication stream(s) to destination device(s).

In block 307, the packet cloning/assembly logic may handle responses from the assembly logic and/or from the destination device(s). The responses may be handled in any of various ways. As one example, in one embodiment the assembly logic may choose to open a socket and handshake with the destination device. In this way, the assembly logic may "pretend" to be or "mimic" the operation of the initiating (or source) device, perhaps providing authentication credentials or other information about the source which may be stored to a storage location accessible by the assembly logic.

Responses may be handled in the same manner as the original requests. In one embodiment, all routing mechanics employ identical rule sets and all communication is bi-directional. Communication may be passed to/from originating devices with no intervention. Alternatively, communication may be effected by the cloning/assembly logic to "correct" malformed data. Communication to/from cloning/assembly logic including responses falls back to the same or similar routing technology as described above.

In block 308, the packet cloning/assembly logic may send a response to the initiator (e.g., to a source device). For instance, the source device may expect a response from the destination device that indicates that the destination device successfully received the communication, and the packet cloning/assembly logic may send such a response to the source device. In the above case, where the assembly logic handles the authentication request, information pertaining to the state or outcome of the authentication attempt may be needed (and thus may be communicated in a response).

Figure 4:
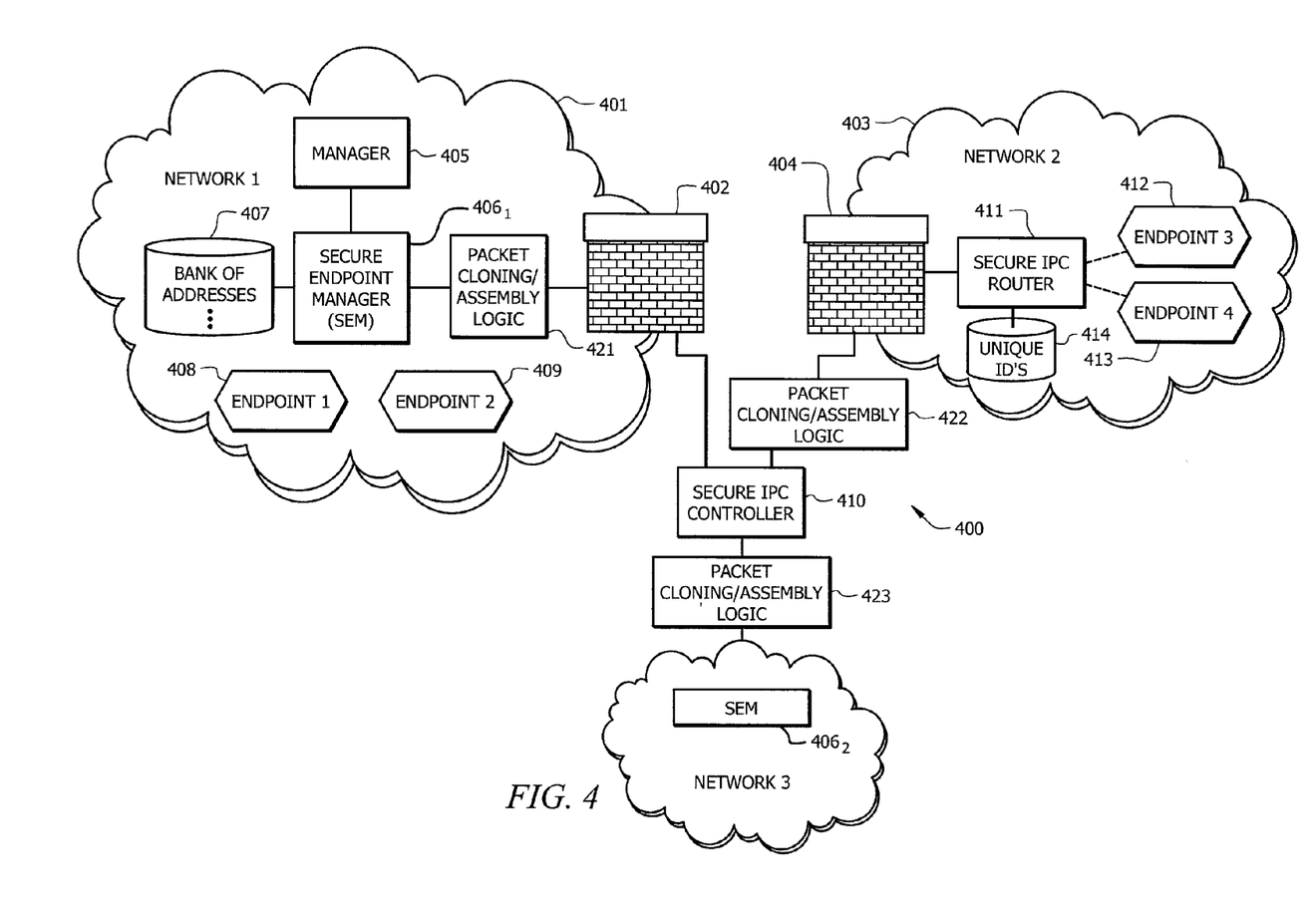
FIG. 4 shows a further exemplary system according to an embodiment of the present invention.

FIG. 4 shows one exemplary system 400 in which embodiments of the present invention may be deployed. Of course, embodiments of the present invention are not limited in application to an environment/system such as that described with FIG. 4, but instead FIG. 4 merely provides one illustrative example. In the example of FIG. 4, packet cloning/assembly logic may be employed for enhancing communication between a managed device and one or more management devices. For instance, the packet cloning/assembly logic may be employed for enhancing communication between one or more of the devices/nodes in a system such as those disclosed in co-pending and commonly-assigned U.S. patent application Ser. No. 12/505,268, filed Jul. 17, 2009, entitled "SYSTEMS AND METHODS FOR MANAGEMENT OF NODES ACROSS DISPARATE NETWORKS" (hereafter "the '268 application"), the disclosure of which is incorporated herein by reference.

FIG. 4 shows a block-diagram representation of an exemplary system 400 for managing network nodes (e.g., multimedia communication endpoints) across disparate protected networks (e.g., networks 401 and 403). System 400 comprises two disparate protected networks, network 401 and network 403. Each of the networks may, for example, be a LAN of different entities (e.g., different organizations, companies, etc.). Each network is protected by a respective firewall. For instance, firewall 402 is implemented for network 401, and firewall 404 is implemented for network 403. Each network's firewall restricts certain externally-originated communication from entering the protected network to screen out unwanted or malicious traffic. In addition, the firewall may be configured to restrict what external resources devices within the protected network may be permitted to access.

In the illustrated example of FIG. 4, each of network 401 and 403 comprises one or more network nodes. For instance, multimedia communication endpoint devices 408 and 409 are coupled to network 401, and multimedia communication endpoint devices 412 and 413 are coupled to network 403. The endpoint devices may be any suitable devices that output communication to participants on a call and/or that receive input communication from participants on a call, such as video capture equipment, video display equipment, voice capture equipment, and voice output equipment. Examples of such multimedia communication endpoint devices include telephones, videophones, VoIP phones, etc. The endpoint devices may be stand-alone devices or they may be embedded with another device, such as integrated with or implemented on a PC or other processor-based computing device. The endpoint devices may be employed for enabling users to communicate with each other during multimedia communication sessions. Such multimedia communication may be conducted via the Internet (e.g., IP-based communication) and/or other communication networks for communicating voice, video, and/or other content (e.g., presentation data, screen-sharing, etc.) between the users during a multimedia communication session established between the users. While multimedia communication endpoint devices are mentioned in the discussion of FIG. 4, it should be understood that other network nodes may be implemented and such other network nodes may be managed in a similar manner as described herein for managing the endpoint devices of FIG. 4.

Techniques, such as those disclosed in the '268 application, may be employed to enable the endpoint devices across disparate protected networks (e.g., endpoint devices 408, 409, 412, and 413 across networks 401 and 403) to be managed from one or more central management systems. For instance, in the illustrated example of FIG. 4 a management system 405 is implemented within network 401. Such management system 405 may comprise any endpoint management system, such as the TMS system available from TANDBERG (now part of the Cisco TelePresence Technology Group) or the Polycom CMA server, as non-limiting examples. While described in connection with FIG. 4 as an endpoint management system, in certain embodiments management system 405 may be a management system for managing any network nodes, such as intermediate nodes (e.g., routers, switches, etc.). Management system 405 generally comprises a processor-based system, which may include a management application executing on a personal computer (PC) or other computer coupled to network 401, and management system 405 may further comprise user input and output devices, such as a display to which a user interface of the management application is presented, and a keyboard, mouse, and/or other input devices for receiving input from the user to the management application. Techniques, such as those discussed further in the '268 application, may enable management system 405 to be used for performing management operations not only for endpoint devices 408 and 409 that reside on the common network 401 with management system 405 (as with traditional multimedia endpoint management systems), but also for endpoint devices residing on disparate protected network(s), such as endpoints 412 and 413 residing on network 403.

Any of various management operations, such as scheduling use of the endpoints for conferences, upgrading/updating software on the endpoint devices, configuring the endpoint devices, monitoring and diagnosing problems of the endpoint devices, and/or performing various other management operations for the endpoint devices, may be desired from time to time. Any such management operations may be supported by management system 405. For instance, a user may interact with a management application executing on management system 405 to control performance of any such management operations for endpoint devices 408, 409, 411, and 413.

Techniques, such as those disclosed in the '268 application, enable such management of multimedia endpoint devices 408, 409, 412, and 413 across disparate protected networks 401 and 403 without requiring establishment of a NAT or VPN, without requiring undesirable administrative burden for establishing communication connections between the management system 405 and the endpoint devices in the disparate protected networks, and without requiring a sacrifice in desired security protection provided by each protected network's firewall. In the exemplary embodiment of FIG. 4, a centralized management system that enables management of multimedia endpoint devices 408, 409, 412, and 413 across the disparate protected networks 401 and 403 via management system 405 is achieved through implementation of one or more secure endpoint managers (SEMs) 406 within network 401, secure IPC controller 410, and secure IPC router 411 within network 403, as discussed further hereafter (as well as in the '268 application).

SEM $406_1$, which may be referred to herein as a manager support device, resides on the same network 401 as management system 405. Additionally, another SEM $406_2$ which resides on a disparate network, network 3, may be implemented. In some instances, both SEM $406_1$ and $406_2$ may be used for managing certain ones of endpoint devices 408, 409, 412 and 413. SEM $406_1$ generally comprises a processor-based system, which may include a computer-executable software application executing on a personal computer (PC) or other computer coupled to network 401 (e.g., for performing the operations described further herein for SEM $406_1$). Similarly, SEM $406_2$ generally comprises a processor-based system, which may include a computer-executable software application executing on a personal computer (PC) or other computer coupled to network 3 (e.g., for performing the operations described further herein for SEM $406_2$). While shown separately for ease of illustration and discussion in FIG. 4, SEM $406_1$ may be implemented on a common processor-based device as management system 405 in certain embodiments. As discussed further below, SEMs $406_1$ and/or $406_2$ effectively extends the reach of management system 405 through the internet into a disparate protected network 403, thereby allowing management system 405 to manage endpoints 412 and 413 as if they resided in local network 401.

As shown in the example of FIG. 4 (and as discussed further in the '268 application), SEM $406_1$ may be communicatively coupled to a data storage device 407 to which is stored a pool of addresses/identifications of various endpoint devices for which management access has been granted to management system 405. That is, a bank of IP addresses may be stored as computer-readable data (e.g., as a database, file, chart, or other data structure) to data storage device 407, where the bank of IP addresses include addresses that effectively identify the endpoints 412 and 413 of the disparate protected network 403. In certain embodiments, the bank of IP addresses assign a local address to each endpoint, thereby making the remote devices 412 and 413 appear to management system 405 as though they reside in local network 401. In this way, SEM $406_1$ enables management system 405 to not only access the endpoint devices 408 and 409 residing on network 401, but also access the various endpoint devices 412 and 413 residing on disparate network 403 as if those devices 412 and 413 were residing locally on network 401. Similarly, such a pool of addresses/identifications may be stored to a data storage device coupled to SEM $406_2$ for use by it in similarly accessing and managing such endpoint devices.

Data storage device 407 may be any computer-readable data storage device, such as a hard drive, memory, magnetic storage device, optical storage device, etc. Data storage device 407 may reside integral with the computing device implementing SEM $406_1$ and/or may be a separate device that is communicatively coupled (e.g., via a communication network, such as network 401) with the computing device implementing SEM $406_1$.

In one embodiment, a router, such as secure IPC router 411, is implemented in the "far" network 403 (that is remote from the network 401 in which management system 405 resides), where such router 411 compiles a list of endpoints within its network 403 for which management access permission is granted for management system 405. IPC router 411 generally comprises a processor-based system, which may include a computer-executable software application executing on a PC or other computer coupled to network 403 (e.g., for performing the operations described further herein for IPC router 411). The permission for management system 405 to access the endpoint devices 412 and 413 (for management operations) may be granted via secure IPC router 411. For instance, an administrator may interact with a user interface of secure IPC router 411 and/or a user interface of controller 410 to specify those endpoints for which management access permission is granted to management system 405.

The permission list compiled by secure IPC router 411 may identify each endpoint device by a corresponding object identifier (OID) and/or MAC address of the device. In general, assigning an OID to a device is a well-known process that is commonly employed for management of devices (e.g., via SNMP). The OIDs identify devices that can be managed. Of course, identifiers other than OIDs may be employed in certain embodiments. For instance, device identifying information in XML may be obtained (e.g., via HTTP) certain embodiments, and so any information (be it OID, XML source, proprietary discovery protocol messages, etc.) may be used for gathering identifying data for qualifying devices that are able to be managed in accordance with embodiments of the present invention. The compiled list identifying the endpoints on network 403 for which access permission is granted to management system 405 may be stored as computer-readable data (e.g., a file, database, or other data structure) by secure IPC router 411 to a computer-readable data storage device 414 to which secure IPC router 411 is communicatively coupled.

The network address associated with a given endpoint may change from time to time, such as when the endpoint is moved from one conference room to another conference room, etc. In one embodiment, the SNMP trap function may be employed to enable the endpoint device to continue being recognized/accessible for management operations even after its network address changes. For instance, the router 411 may be the trap function host, and a cold start message may be used to obtain the IP address that comes across against the database of identifiers. In other configurations, the registration message may be sniffed to obtain the IP address of the endpoint device. As other examples, RAS messages, SNMP messages, etc. may also be used to obtain the changed network address of the endpoint device by router 411. In general, router 411 keeps track of the local IP address as the device moves around on the local network, and the controller 410 and/or SEMs 406$_1$ and 406$_2$ just use the OID (or other identifier) for the endpoint device.

While only one remote protected network, network 403, is shown in the example of FIG. 4 as containing endpoint devices to be managed by centralized management system 405, in other implementations any number of remote protected networks that contain endpoint devices to be managed by management system 405 may be present. In the illustrated example of FIG. 4, a secure IPC controller 410 is implemented for compiling identification of the various endpoint devices (e.g., across any number of disparate networks) for which management permission is granted to management system 405. Secure IPC controller 410 generally comprises a processor-based system, which may include a computer-executable software application executing on a PC or other computer communicatively coupled to networks 401, 403, and network 3 (e.g., for performing the operations described further herein for IPC controller 410). For instance, each of networks 401, 403 and network 3 may be LANs that are communicatively coupled to a wide area network (WAN), such as the Internet, and IPC controller 410 may likewise be communicatively coupled to the WAN such that it can communicate via the WAN with each of the LANs 401, 403, and network 3.

In the illustrated embodiment, secure IPC controller 410 performs an inventory of the various IPC routers of disparate protected networks, such as IPC router 411 of network 403, to determine those various endpoint devices that reside in the disparate networks which have granted management access permission to management system 405. According to one embodiment, when a router 411 is first brought online (connected to its local network 403), it establishes a communication path with the controller 410. As such, the router(s) 411 that are pre-configured to connect to a given controller 410 (or which are configured by an administrator to connect to a given controller 410) form a community of routers of disparate protected networks that are all communicatively coupled to controller 410. Then, responsive to a user interacting with a user interface of controller 410 to activate an "inventory endpoint button" (or responsive to some other action, such as upon a predefined schedule), controller 410 sends a request out to all of the routers in its community. Each of the routers 411 return to the controller 410 identification of the network nodes (e.g., communication endpoints) on the router's respective protected network for which management permission is granted (e.g., as identified in data storage device 414) to the centralized management system 405. The resulting inventoried list of endpoint devices that have granted permission to management system 405 is made available from controller 410 to SEM 406$_1$, which then assigns (in the address bank stored to storage device 407) a locally-accessible IP address to each endpoint device. Similarly, in some instances a resulting inventoried list of endpoint devices that have granted permission to a management system with which SEM 406$_2$ is associated (e.g., management system 405 or some other management system as may be implemented in network 3) is made available from controller 410 to SEM 406$_2$, which then assigns (in the address bank stored to its local storage device) a locally-accessible IP address to each endpoint device.

Thereafter, when the management system 405 wants to communicate with endpoints 412 and/or 413, it uses the IP address assigned by SEM 406$_1$ to those addresses (within the stored bank of addresses stored to storage device 407). Similarly, when SEM 406$_2$ or a management system within network 3 wants to communicate with endpoints 412 and/or 413, it uses the IP address assigned by SEM 406$_2$ to those addresses (within the stored bank of addresses stored to the local storage device of SEM 406$_2$). In certain embodiments, a similar address mapping may be performed within network 403 (e.g., by router 411) for management system 405 to make management system 405 appear to the endpoints 412 and 413 as though the management system 405 resides locally within network 403 (e.g., so that if the endpoint devices want to push information to the management system they believe they are communicating with a local management system). In certain embodiments, it is transparent to the management system 405 and the managed endpoint devices 412 and 413 that they reside on disparate protected networks and that there is an intermediary between them (e.g., SEM 406$_1$) that is enabling their connection. Thus, to management system 405 the endpoint devices 412 and 413 may appear as though they reside on network 401, like endpoint devices 408 and 409. Thus, traditional management systems, like the TMS system, may be employed to manage the endpoint devices 412 and 413 in the disparate protected network 403 just as those systems commonly manage the local endpoints 408 and 409. Further, the administratively burdensome process for establishing a NAT or VPN with appropriate access rules in order to achieve a connection between management system 405 and the endpoints 412 and 413 is not required.

In certain embodiments, SEM 406$_1$ enables communication between management system 405 and endpoint devices 412 and 413 without requiring modification or reconfiguration of the firewalls 402 and 404. For instance, as discussed further in the '268 application, in certain embodiments SEM 406$_1$ may encapsulate the communication into an encapsulated communication that is transmitted via a single TCP port, thereby enabling the encapsulated communication to traverse firewalls (via a commonly-open port) without requiring any reconfiguration to the firewall to accept the communication. For instance, certain communication techniques described in co-pending and commonly-assigned U.S. patent application Ser. No. 11/403,549 (now U.S. Pat. No. 7,710,978) titled "SYSTEM AND METHOD FOR TRAVERSING A FIREWALL WITH MULTIMEDIA COMMUNICATION," the disclosure of which is incorporated herein by reference, for traversing firewalls may be similarly employed for enabling management information to be communicated from SEMs 406$_1$ and/or 406$_2$ through firewalls of disparate protected networks.

Typically, an endpoint device can only be managed by one management or provisioning server. The ability to clone packets and handle responses in accordance with embodiments of the present invention allow an endpoint to be transparently provisioned and/or managed by multiple management servers and ultimately managed from multiple disparate sites. Neither the endpoint nor management servers need be aware of this.

As an example of the authorization process of an endpoint to a management server via cloning/assembly logic in accordance with one embodiment: The assembly logic may choose to open a socket and handshake with the destination device (which may be a management server, such as a SEM). In this way, the assembly logic may "pretend" to be or "mimic" the operation of the initiating (or source) device (e.g., the endpoint device to be managed), perhaps providing authentication credentials or other information about the endpoint which may be stored to a storage location accessible by the assembly logic.

In accordance with embodiments of the present invention, packet cloning/assembly logic as described above may be employed in the management system of FIG. 4. For instance, packet cloning/assembly logic 421, 422, and 423 may be implemented to enhance the delivery of communication between the managed endpoints and the secure endpoint managers $406_1$ and/or $406_2$. Packet cloning/assembly logic 421 is shown as implemented in network 401, and it may be employed for generating cloned packet stream(s) for outbound communication from SEM $406_1$ (and/or from endpoints 408, 409), as well as for assembling streams from received cloned packet streams and directing the assembled streams to SEM $406_1$ (and/or to endpoints 408, 409). While shown as residing on network 401 (behind firewall 402), in certain embodiments packet cloning/assembly logic 421 may reside outside network 401 (e.g., outside firewall 402) in a manner similar to that shown for packet cloning/assembly logic 422 discussed below. Further, while shown as a separate component in FIG. 4, packet cloning/assembly logic 421 may be integrated with SEM $406_1$, firewall 402 and/or some other device.

Packet cloning/assembly logic 422 is shown as communicatively coupled with secure IPC controller 410 and network 403, and it may be employed for generating cloned packet stream(s) for outbound communication from secure IPC router 411 (and/or from endpoints 412, 413), as well as for assembling streams from received cloned packet streams and directing the assembled streams to IPC router 411 (and/or to endpoints 412, 413). While shown as residing outside of network 403 (outside firewall 404), in certain embodiments packet cloning/assembly logic 422 may reside in network 403 (e.g., behind firewall 404) in a manner similar to that shown for packet cloning/assembly logic 421 on network 401. Further, while shown as a separate component in FIG. 4, packet cloning/assembly logic 422 may be integrated with secure IPC controller 410, secure IPC router 411, firewall 404, or some other device.

Packet cloning/assembly logic 423 is shown as communicatively coupled with secure IPC controller 410 and SEM $406_2$ on network 3, and it may be employed for generating cloned packet stream(s) for outbound communication from SEM $406_2$, as well as for assembling streams from received cloned packet streams and directing the assembled streams to SEM $406_2$. While shown as a separate component in FIG. 4, packet cloning/assembly logic 423 may be integrated with secure IPC controller 410, SEM $406_2$, or some other device.

In certain embodiments, stored/recorded communication from an endpoint might be used at a later time for communicating information (unaware to the endpoint) to a SEM, such as SEM $406_2$, thereby allowing management by two SEMs $406_1$ and $406_2$ of the endpoint.

Although the present teachings and their advantages have been described in detail, it should be understood that various changes, substitutions and alterations can be made herein without departing from the technology of the teachings as defined by the appended claims. Moreover, the scope of the present application is not intended to be limited to the particular aspects of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding aspects described herein may be utilized according to the present teachings. Accordingly, the appended claims are intended to include within their scope such processes, machines, manufacture, compositions of matter, means, methods, or steps.

What is claimed is:

1. A method comprising:
   receiving, at packet cloning logic, an original stream of packets communicated from a source device;
   generating, by said packet cloning logic, a cloned packet stream containing a plurality of cloned packets for each of a plurality of packets contained in said original stream, wherein said plurality of cloned packets each comprise payload content of a corresponding packet in said original stream, and wherein the cloned packet stream comprises a single stream of data packets which includes multiple instances of cloned packets corresponding to each of the plurality of packets contained in said original stream;
   communicating, from said packet cloning logic to at least one packet assembly logic, said cloned packet stream, wherein said communicating provides for two or more cloned packets of said cloned packet stream for each of the plurality of packets contained in said original stream being directed from said packet cloning logic to a same packet assembly logic of said at least one packet assembly logic; and
   assembling, by said at least one packet assembly logic, at least one stream of packets corresponding to said original stream of packets for communication to at least one destination device.

2. The method of claim 1 wherein said packet cloning logic comprises a processor-based device; and wherein said packet assembly logic comprises a processor-based device.

3. The method of claim 1 wherein said at least one stream of packets corresponding to said original stream of packets comprises:
   packets containing same payload content as in said original stream of packets and having relative order same as in said original stream of packets.

4. The method of claim 1 wherein said original stream of packets comprises an IP Datagram stream.

5. The method of claim 4 wherein said at least one stream of packets corresponding to said original stream comprises an IP Datagram stream.

6. The method of claim 1 further comprising:
   storing, by said packet cloning logic, the received original stream of packets to a data storage device.

7. The method of claim 6 wherein said receiving said original stream of packets is during a first communication session between said source device and a first destination device of said at least one destination device, and wherein said communicating said cloned packet stream and assembling said at least one stream of packets occurs after conclusion of said first communication session.

8. The method of claim 1 wherein said generating said cloned packet stream further comprises:
   generating said cloned packet stream to further comprise additional information not contained in the packets in said original stream.

9. The method of claim 8 wherein said additional information comprises at least one of:
   a unique identifier assigned to said packet cloning logic within a predefined communication community, priority information, information describing route conditions, authentication information, and database update information for the predefined communication community.

10. The method of claim 1 further comprising:
communicating said at least one stream of packets corresponding to said at least one stream of packets from said packet assembly logic to said at least one destination device.

11. The method of claim 10 wherein said receiving said original stream of packets and said communicating said at least one stream of packets to said at least one destination device occurs during a bi-directional communication session between said source device and said at least one destination device.

12. The method of claim 11 wherein said bi-directional communication session comprises a multiparty interactive communication session between said source device and said at least one destination device in real time.

13. An apparatus comprising:
an interface for receiving a first original stream of packets communicated from a source device;
packet cloning logic configured to generate a first cloned packet stream containing a plurality of cloned packets for each of a plurality of packets contained in a received first original stream of packets, wherein said plurality of cloned packets each comprises payload content of a corresponding packet in said received first original stream of packets, and wherein the first cloned packet stream comprises a single stream of data packets which includes multiple instances of cloned packets corresponding to each of the plurality of packets contained in the first original stream of packets;
an interface for communicating, from said packet cloning logic, said first cloned packet stream;
an interface for receiving a second cloned packet stream containing a plurality of cloned packets for each of a plurality of packets contained in a second original stream of packets, wherein said first original stream of packets and said second original stream of packets are different original streams of packets, and wherein the second cloned packet stream comprises a single stream of data packets which includes multiple instances of cloned packets corresponding to each of the plurality of packets contained in the second original stream of packets;
packet assembly logic configured to assemble, from the received second cloned packet stream, at least one stream of packets corresponding to the second original stream of packets; and
an interface for communicating, from said packet assembly logic, said at least one stream of packets assembled by said packet assembly logic.

14. The apparatus of claim 13 wherein said first original stream of packets is communicated from a first source device and said second original stream of packets is communicated from another source device.

15. The apparatus of claim 13 wherein said apparatus comprises a processor-based device.

16. The apparatus of claim 13 wherein said packet cloning logic comprises computer-executable software stored to a data storage device that is executable by a processor for generating the cloned packet stream.

17. The apparatus of claim 13 wherein said assembly logic comprises computer-executable software stored to a data storage device that is executable by a processor for assembling said at least one stream of packets.

18. The apparatus of claim 13 wherein said first original stream of packets comprises an IP Datagram stream, and wherein said at least one stream of packets assembled by said packet assembly logic comprises an IP Datagram stream.

19. An apparatus comprising:
an interface for receiving a first original stream of packets communicated from a source device;
packet cloning logic configured to generate a cloned packet stream containing a plurality of cloned packets for each of a plurality of packets contained in a received first original stream of packets, wherein said plurality of cloned packets each comprises payload content of a corresponding packet in said received first original stream of packets, and wherein the cloned packet stream comprises a single stream of data packets which includes multiple instances of cloned packets corresponding to each of the plurality of packets contained in said first original stream of packets;
an interface for communicating, from said packet cloning logic, said cloned packet stream;
an interface for receiving the cloned packet stream containing the plurality of cloned packets for each of the plurality of packets contained in the first original stream of packets;
packet assembly logic configured to assemble, from the received cloned packet stream, at least one stream of packets corresponding to the first original stream of packets; and
an interface for communicating, from said packet assembly logic, said at least one stream of packets assembled by said packet assembly logic.

* * * * *

UNITED STATES PATENT AND TRADEMARK OFFICE
CERTIFICATE OF CORRECTION

| | | |
|---|---|---|
| PATENT NO. | : 8,861,520 B1 | Page 1 of 1 |
| APPLICATION NO. | : 13/034444 | |
| DATED | : October 14, 2014 | |
| INVENTOR(S) | : Christopher S. Signaoff et al. | |

It is certified that error appears in the above-identified patent and that said Letters Patent is hereby corrected as shown below:

In the Specification

At column 16, line number 59, delete "$1_3$'" and replace with --$1_3^c$--.

Signed and Sealed this
Tenth Day of February, 2015

Michelle K. Lee
*Deputy Director of the United States Patent and Trademark Office*